United States Patent [19]

Huang

[11] Patent Number: 5,228,002

[45] Date of Patent: Jul. 13, 1993

[54] FIRST-IN FIRST-OUT MEMORY DEVICE AND METHOD FOR ACCESSING THE DEVICE

[75] Inventor: Samson X. Huang, Sunnyvale, Calif.

[73] Assignee: Quality Semiconductor Inc., Santa Clara, Calif.

[21] Appl. No.: 691,996

[22] Filed: Apr. 26, 1991

[51] Int. Cl.$^5$ .............................................. G11C 13/00
[52] U.S. Cl. ...................................... 365/221; 365/219
[58] Field of Search ............................. 365/219–220, 365/221–230.05, 189.02

[56] References Cited

U.S. PATENT DOCUMENTS

| | | | |
|---|---|---|---|
| 4,888,741 | 12/1989 | Malinowski | 365/221 |
| 4,891,788 | 1/1990 | Kreifels | 365/221 |
| 5,027,326 | 6/1991 | Jones | 365/221 |
| 5,093,805 | 3/1992 | Singh | 365/221 |

*Primary Examiner*—Eugene R. LaRoche
*Assistant Examiner*—A. Zarabian
*Attorney, Agent, or Firm*—Majestic, Parsons, Siebert & Hsue

[57] ABSTRACT

To reduce the access time of a FIFO, a storage device is provided for storing pre-loaded data to be read from the memory array of the FIFO. Thus during each read operation, the pre-loaded data in the storage device is read and the next unit of data to be read during the next read operation is pre-loaded from the array into the storage device. A second storage device is provided for storing the first unit of data written into the array after the array is empty. Thus during the first read operation after the array is rendered non-empty by one or more consecutive write operations, the first unit of data stored in the second storage device is read during the first read operation. This avoids reading garbage from the first storage device which is pre-loaded during the last read operation before the FIFO is empty.

19 Claims, 4 Drawing Sheets

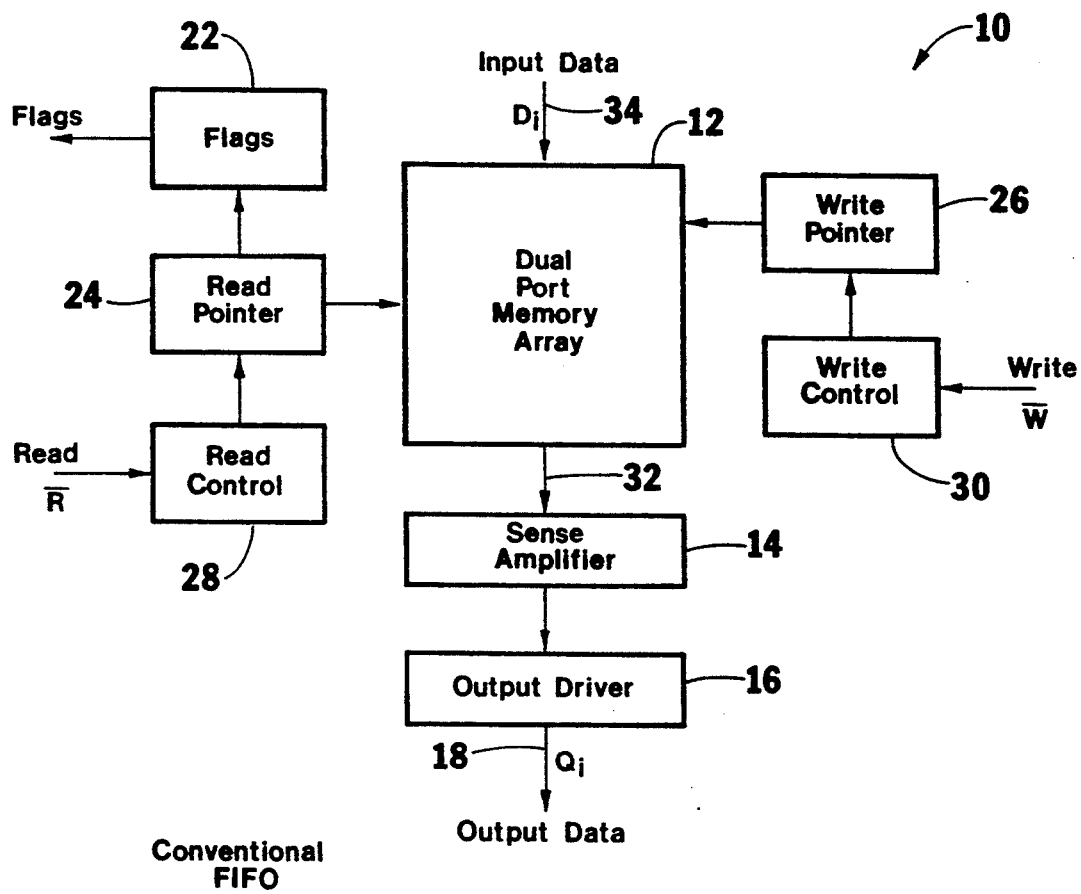
FIG.—1.
PRIOR ART
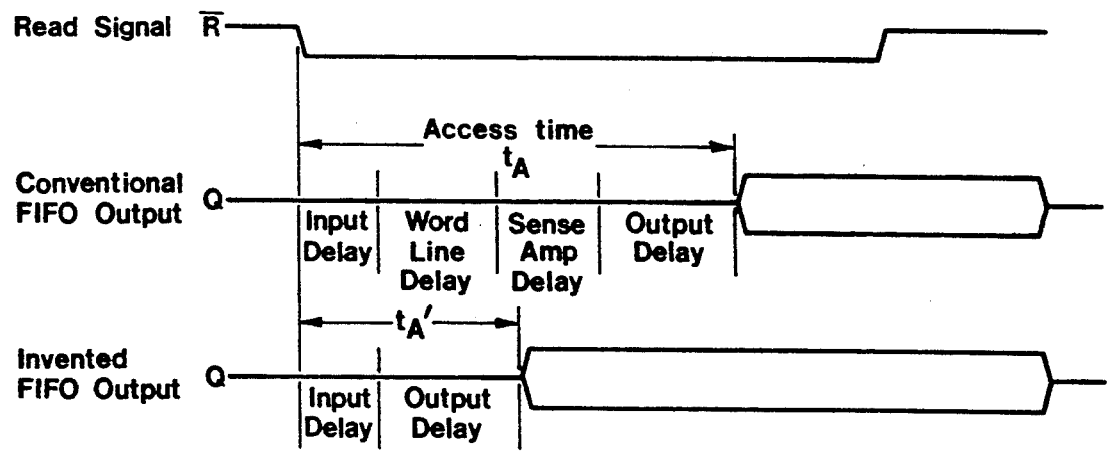
FIG.—2.

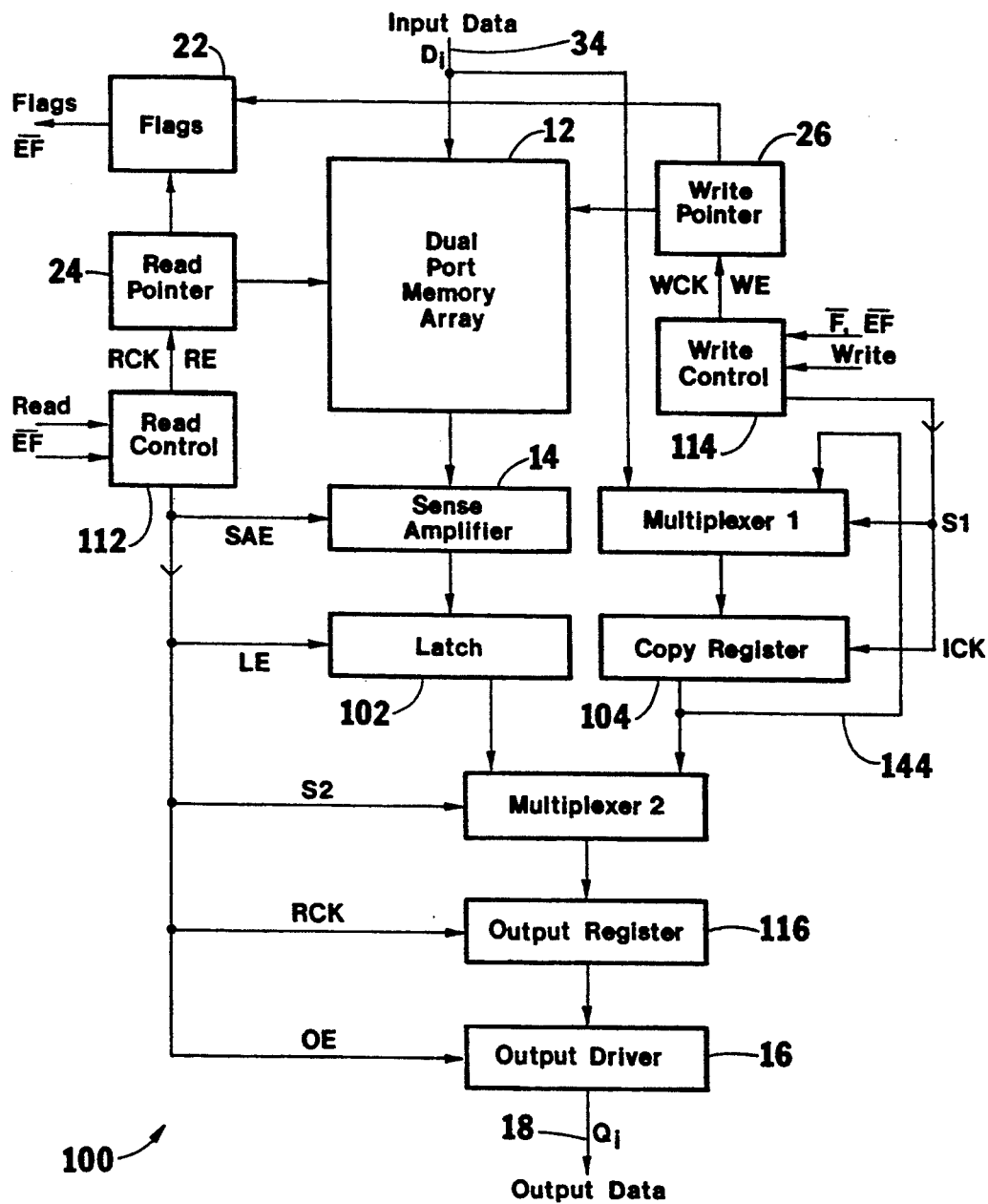
FIG._3.

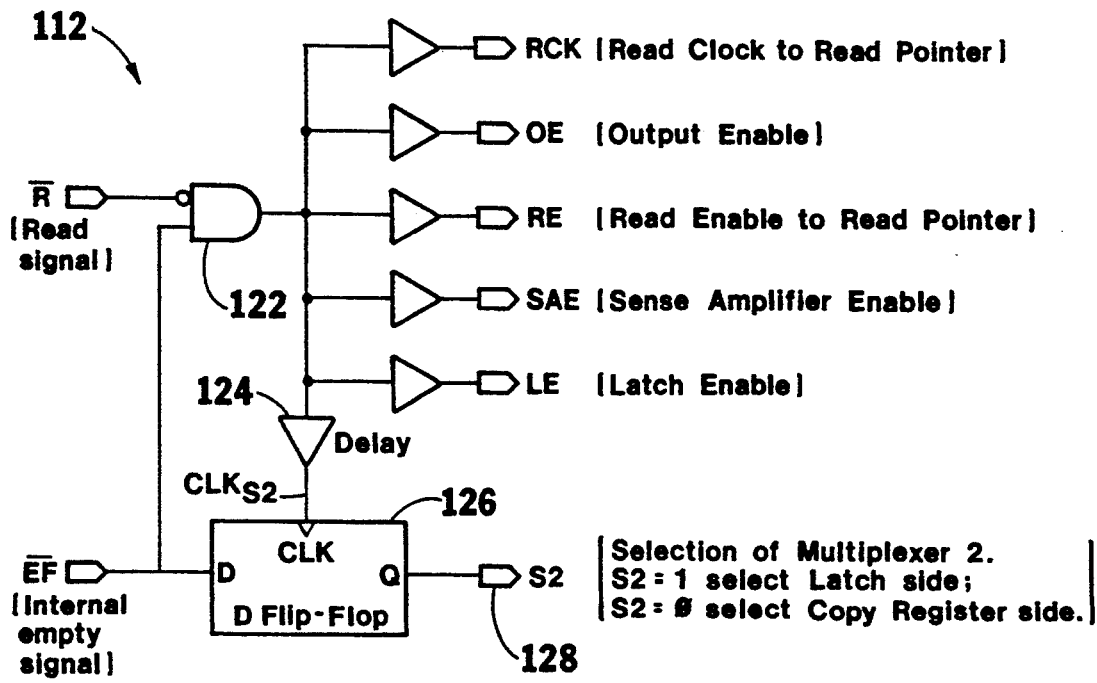
FIG._4.
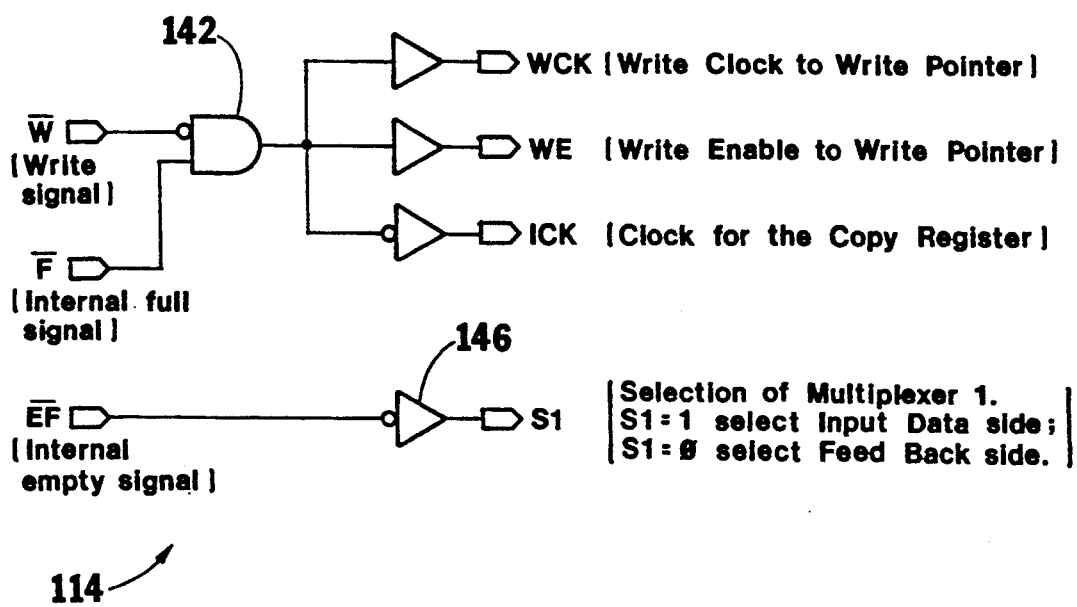
FIG._5.

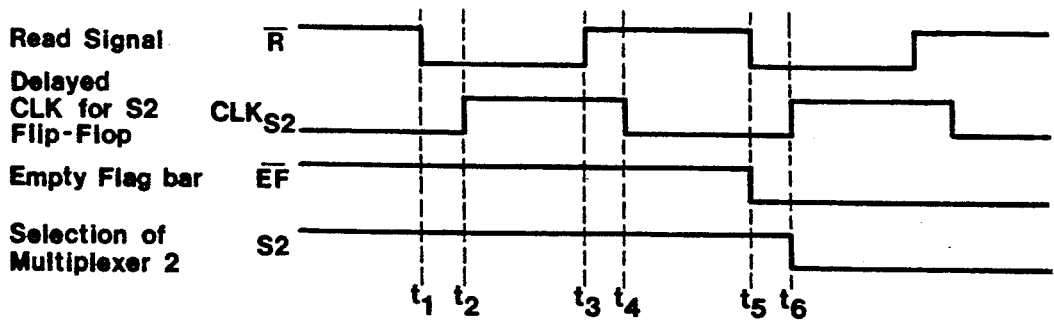
FIG._6A.
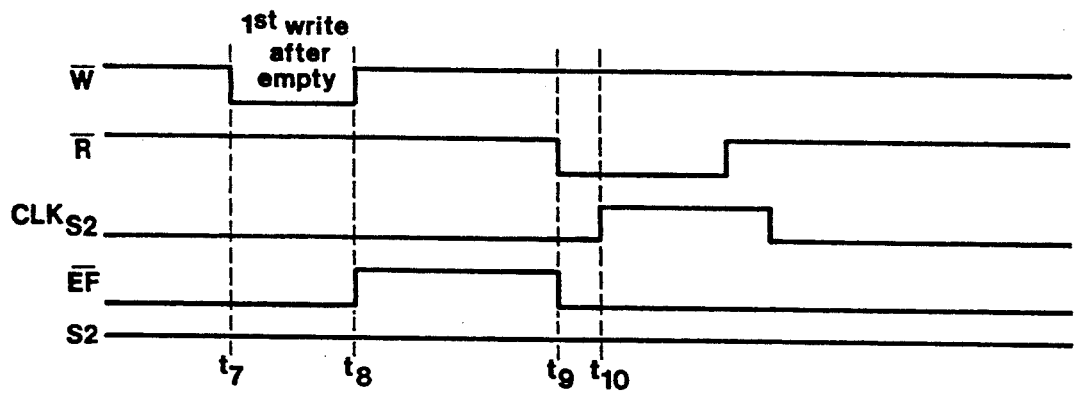
FIG._6B.
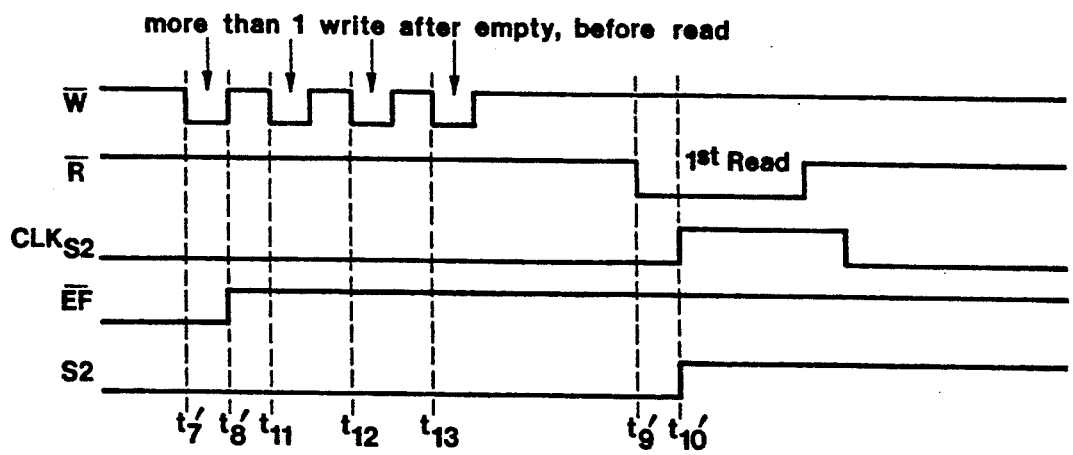
FIG._6C.

FIRST-IN FIRST-OUT MEMORY DEVICE AND METHOD FOR ACCESSING THE DEVICE

BACKGROUND OF THE INVENTION

This invention relates in general to first-in first-out ("FIFO") memory devices and methods for accessing the device and in particular, to a pipelined FIFO device and method with improved access time.

FIFOs are accessed by means of read signals. The access time of a FIFO is the delay time from the point in time when the read signal is applied to the FIFO to the subsequent point in time when valid data appears at the output of the FIFO. A FIFO typically has a memory array, word lines which supply the address signals for selecting the location in the array from which data is to be read, and bit lines for supplying the data read from the array to the FIFO output. Traditionally, FIFOs have been accessed in a manner similar to that for static random access memories. The access procedure includes pulling up the word lines connected to a memory array of the FIFO. The data in the array then appears on bit lines where the bit line data is amplified by a sense amplifier before it is sent to an output driver for driving the FIFO output. Such procedure requires considerable time so that conventional FIFOs have long access times. The slow access of memory devices such as conventional FIFOs frequently becomes the bottleneck in a computer system and determines the speed of the system. It is therefore desirable to provide FIFOs with improved access time.

SUMMARY OF THE INVENTION

This invention is based on the observation that the long access time of conventional FIFOs is caused by the significant time required for the data to appear on the bit lines of the memory array after a read signal is applied to the word lines and by the slow speed of the sense amplifier. If data from the array is amplified and stored in a storage device before the read signal reaches the word lines in a process referred to below as preloading, the data stored in the storage device may be read in response to read signal to greatly speed up the reading process and therefore reduce the access time of the FIFO.

One aspect of the invention is directed towards a first-in first-out memory device that has an output and that is accessed during a plurality of sequential read operations in response to read signals during each operation. The device comprises a memory array and at least one storage means for storing data. The device further comprises means responsive to read signals for reading data stored in one of said storage means and supplying such data to the device output, and for reading data from the array and supplying such data to one of said storage means to update the data stored in said storage means for the next read operation. In this manner access time of the device is reduced.

The method of this invention is for accessing the device described above. The method comprises the step of reading data stored in the storage means and supplying such data to the device output and reading data from the array and supplying such data to the storage means during each read operation to update the data stored in the storage means for the next read operation.

As explained above, the access time of the FIFO is reduced by pre-loading data from the memory array into a storage means before a read signal is applied.

However, if a FIFO is empty before one or more consecutive write operations which render the FIFO nonempty, and if the FIFO is then accessed during a first read operation, there is no chance to pre-load any data into the storage means. Therefore, according to the preferred embodiment of the invention, during the first write operation after the FIFO is empty, the first unit of data written into the FIFO is also stored in a storage device. Then during the first read operation, data is read from such storage.

BRIEF DESCRIPTION OF THE DRAWINGS

FIG. 1 is a block diagram of a conventional FIFO.

FIG. 2 is a timing diagram illustrating the access time of the conventional FIFO of FIG. 1 verses the access time of the FIFO invented by Applicant illustrated in FIG. 3.

FIG. 3 is block diagram of a FIFO to illustrate the preferred embodiment of the invention.

FIG. 4 is a schematic circuit diagram of the read control block of FIG. 3.

FIG. 5 is a block diagram of the write control block of FIG. 3.

FIGS. 6A–6C are timing diagrams to illustrate the FIFO of FIGS. 3–5.

DETAILED DESCRIPTION OF THE INVENTION

FIG. 1 is a block diagram of a conventional FIFO. FIFO 10 includes a memory array 12, a sense amplifier 14, an output driver 16 and an output port 18. FIFO 10 also includes a flag generator 22, read and write pointers 24, 26, read control circuit 28, write control circuit 30 and an input port 34. As is known to those skilled in the art, the read signal $\overline{R}$ is applied to read control 28. The read signal is then applied through read pointer 24 to the word line in memory array 12. A significant amount of time will be required from the point in time when the read signal is applied to the read control 28 to the time when data from array 12 appears on the bit lines 32 for application to the sense amplifier 14. Sense amplifier 14 is usually also slow and requires a significant amount of time before the amplified data signals are applied to output driver 16. Driver 16 then drives the output 18. The different factors contributing to the access time of a conventional FIFO such as FIFO 10 are illustrated in FIG. 2. In FIG. 2, the read cycle begins when the read signal $\overline{R}$ falls low, and ends when the read signal goes high again. As is clear from FIG. 2, the word line delay and the delay caused by the sense amplifier occupy a considerable portion of the read cycle.

FIG. 3 is a block diagram of a FIFO to illustrate the preferred embodiment of the invention. For simplicity, identical components are indicated by the same numerals. In addition to the different components of FIFO 10, FIFO 100 of FIG. 3 also includes a storage means such as latch 102 for pre-loading the data from array 12. As will be described in detail below, input data from input 34 may also be loaded into another storage such as copy register 104. Then when the read signal $\overline{R}$ falls low on the word line as applied to read control 112, the preloaded data in latch 102 or copy register 104 is then read and provided to output 18. Thus the word line delay and the sense amplifier delay are avoided in the design of FIG. 3 to greatly improve the access time of the FIFO. The much improved access time of the FIFO in FIG. 3 as compared to that of the FIFO 10 in FIG. 1 is illustrated in FIG. 2. As shown in FIG. 2, the access time $t_4$ for FIFO 100 of FIG. 3 is much smaller than that from FIFO 10 of FIG. 1.

In order for latch 102 to be pre-loaded with data from the array 12, a pipe-lined operation is contemplated. Thus during each read operation, in addition to reading the data from either latch 102 or copy register 104 and providing such data at output 18, data is also pre-loaded from array 12 to latch 102. The function of copy register 104 will now be discussed. A problem arises when FIFO 100 is accessed during a first read operation after the array 12 is rendered from empty to non-empty by one or more consecutive write operations. For illustration, assume that array 12 is empty. Data is then written into the array 12 through input 34 to render the FIFO non-empty. After the first write operation, there could be one or more write operations, forming a sequence of consecutive write operations occurring after the FIFO is empty to render it non-empty. The first occurring read operation subsequent to such one or more consecutive write operations may be referred to below as the "first read operation after non-empty." During the one or more consecutive write operations after the FIFO is empty, no valid data has been pre-loaded into latch 102. Hence during such first read operation after the FIFO becomes non-empty, if one attempts to read data from latch 102 and provide such data at output 18, garbage will be read and provided instead. In such event, it is desirable to store the first data written into the array during the very first write operation to remedy this situation.

A unit of data such as a byte of data is typically written into array 12 during each write operation. Thus during the first write operation occurring when array 12 is empty, in addition to writing the data from input 34 into array 12, the first unit of data is also written into copy register 104. Then during the first read operation after FIFO 100 becomes non-empty, the first unit of data is read from copy register 104 instead of from latch 102. The read control circuit 112 and the write control circuit 114 have been designed to allow for such features. Multiplexer 1, multiplexer 2 and output register 116 are also employed as shown in FIG. 3. FIGS. 4 and 5 are block diagrams of the read control circuit 112 and write control circuit 114.

The operation of FIFO 100 will now be illustrated in reference to FIGS. 3-5. Except for the special situation referred to above concerning the first read operation after FIFO 100 is rendered non-empty, the FIFO will function as follows. Assume that the FIFO is non-empty. Since the FIFO is non-empty, the empty flag signal $\overline{EF}$ from flag generator 22 will be high. Thus the read signal $\overline{R}$ will pass through AND-gate 122 in FIG. 4 to generate the enabling signals RCK, OE, RE, SAE and LE. A unit of data has been pre-loaded in latch 102 so that the enabling signals LE, RCK and OE will cause the data unit pre-loaded in latch 102 to be read and provided to output 18. The function of multiplexer 2 and control signal S2 will be discussed below. During the same read operation when the pre-loaded data is read from latch 102 to output 18, the enabling signals RE, RCK and SAE will cause the next-to-be-read data unit to be pre-loaded from array 12 to latch 102, ready for the next read operation. Hence the time consuming operations involving word line delay and the slow sense amplifier for reading a unit of data have been performed in the previous read operation so that the access time of FIFO 100 is much less than that for FIFO 10 in FIG. 1.

As indicated above, special provisions will need to be made in the above pipe-lined operation immediately after array 12 becomes empty. The operation of FIFO after the FIFOs become empty is illustrated in reference to FIGS. 3-5 and timing diagrams 6A-6C. The time period t1-t3 in FIG. 6A marks the next to last read cycle before the FIFO becomes empty. In reference to FIG. 6A, when the read signal $\overline{R}$ falls low at t1, the second to the last unit of data in the array is being read from latch 102 to output 18. Also during the read cycle from time t1 to t3, the last unit of data present in the array is being pre-loaded from array 12 to latch 102. As will become apparent below, if the latch 102 has a valid pre-load during a read operation, S2 in FIG. 4 and 6A will be set to "1" and thus forces multiplexer to select the latch output as its input value for the next read. If, however, there has been only one write operation after array 12 becomes empty and the one and only write operation is followed by a read operation, there is no valid pre-load, and S2 will remain at "0" despite the one and only write operation, and thus causes multiplexer 2 to select the copy register output as its input value for the next read.

The generation of the control signal S2 is illustrated in FIGS. 4 and 6A. At the beginning of the read cycle at times t1, t5, the read signal $\overline{R}$ falls low. At such times, the empty flag signal $\overline{EF}$ would still be high, causing the read signal to pass AND-gate 122 to generate enabling signals as described above. AND-gate 22 also passes the read signal at times t1, t5 to a delay circuit 124 (e.g. inverter). The delayed read signal labelled $CLK_{S2}$ in FIG. 4 is applied to the clock input of D flip-flop 126 as the clock signal. At time t2, the clock signal $CLK_{S2}$ goes high, thereby clocking the empty flag signal $\overline{EF}$ to the flip-flop Q output at terminal 128. The Q output of the D flip-flop at terminal 128 provides the control signal S2. At time t2, since the empty flag signal $\overline{EF}$ is high, the control signal S2 at terminal 128 remains high. At time t3, marking the end of the read cycle, the read signal $\overline{R}$ goes high, and at time t4, the clock signal $CLK_{S2}$ falls low. It will be noted that times t2, t4 are delayed relatively to times t1, t3 respectively by a predetermined delay determined by the delay circuit 124.

At the onset of the next read cycle at time t5, array 12 is empty so that generator 22 causes the empty flag signal $\overline{EF}$ to fall low. At such time, array 12 is already empty so that the enabling signals SAE and RE will cause garbage to be pre-loaded into latch 102. At time t5, gate 122 still passes the read signal $\overline{R}$ to generate the enabling signals for reading the last unit of data in latch 102 to output 18. At time t6 which is a predetermined time (determined by delay 124) after t5, the clock signal $CLK_{S2}$ rises, thereby clocking through the low value of the empty flag to terminal 128, thereby causing the control signal S2 to fall low.

In reference to FIG. 3, multiplexer 2 is such that it selects the output from latch 102 when S2 is high, but selects the output of copy register 104 when the control signal S2 is low. Hence beginning at time t6, multiplexer 2 will select the output of copy register 104 instead of latch 102.

Since the empty flag signal is low, this disables the gate 122 so that no enabling signals will be generated by read control circuit 112 irrespective of the status of the read signal $\overline{R}$, as is evident from FIG. 4. The first operation capable of accessing the FIFO therefore must be a write operation, as illustrated in FIGS. 6B, 6C. FIG. 6B is a timing diagram illustrating the operation of FIFO 100 when a single write operation after the FIFO is empty is followed by a read operation. FIG. 6C is a timing diagram illustrating the operation of the FIFO 100 when there are more than one consecutive write operations after the FIFO is empty, before any read operation. In reference to FIG. 6B, at time t7, the write signal $\overline{W}$ falls low. Generator 22 also generates an internal full signal $\overline{F}$. Since the FIFO 100 is empty, the internal full signal $\overline{F}$ will be high, thereby permitting gate 142 of FIG. 5 to pass the write signal $\overline{W}$ to generate the enabling signals WCK, WE and ICK. The signal WCK enables the write pointer 26 and the signal ICK enables the copy register 104. Write control circuit 114 also generates a select signal S1 to control the writing of data into copy register 104. During the very first write cycle after array 12 is empty, the first unit of data from input 34 is selected and loaded into copy register 104. After the first write operation, the feedback path 144 is selected instead to keep the content of the copy register 104 unchanged. This process is controlled by select signal S1 described below.

As shown in FIG. 5, the select signal S1 is inverted from the empty flag signal $\overline{EF}$ with a delay determined by delay circuit 146 (which may be a simple inverter). When array 12 is empty beginning at time t5 in FIG. 6A, the empty flag signal $\overline{EF}$ is low. At a predetermined time thereafter, select signal S1 follows the empty fag signal high, causing multiplexer 1 to select the unit of data from input 34 instead of from the feedback path 104. Therefore, at time t7 in FIG. 6B, the select signal S1 has already gone high. Therefore, when the falling edge of the write signal $\overline{W}$ causes the generation of the enabling signal ICK at time t7, the signal ICK causes the first unit of data written into the FIFO after the FIFO is empty to be loaded into copy register 104 through multiplexer 1. At the end of the write cycle at time t8, the write signal $\overline{W}$ goes high and generator 22 causes the empty flag signal $\overline{EF}$ to be high as well. Time t9 marks the beginning of the first read cycle occurring after the first and only write cycle after empty from t7 to t8. In reference to FIG. 4, gate 122 permits the passage of the read signal to generate the enabling signals, since the empty flag signal $\overline{EF}$ is high. Even though the empty flag signal $\overline{EF}$ has risen high, delay circuit 124 delays the generation of the clock signal $CLK_{S2}$ so that the control signal S2 of terminal 128 remains low as shown in FIG. 6B. Hence the enabling signals in RCK and OE and the low value of control signal S2 causes the content of the copy register 104 to be selected and provided to output 18. In this manner delay circuit 124 enables the proper selection of multiplexer 2 despite the change in value of the empty flag signal at times t8 and t9. At time 10, the delayed clock signal $CLK_{S2}$ rises, thereby clocking through the empty flag signal to terminal 128. At this time, however, generator 22 has already caused the empty flag signal to fall low, indicating that the FIFO is once again empty. In this manner, the control signal S2 remains low so that the next read operation will again cause the content of the copy register 104 to be read and provided to output 18 instead of the garbage which has been loaded into latch 102. Again the low value of the empty flag signal will disable gate 122 to prevent any read operation.

Instead of writing only one unit of data such as a byte of data into array 12 before reading it out again in a read operation, the more common situation is that more than one consecutive write operations will be carried out after the FIFO is empty to write more than one unit of data sequentially into array 12 before any read operations. The operation of FIFO 100 in such circumstances is illustrated in FIG. 6C. Again it is assumed that array 12 is empty so that the empty flag signal is low and the select signal S1 is high. Similar to time t7 in FIG. 6B, at time t7' in FIG. 6C, the write signal $\overline{W}$ falls low, causing the write control circuit 114 to generate the enabling signals for loading the first unit of data written into array 12 from input 34 to be loaded into copy register 104. Similar to time t8 in FIG. 6B, at time t8', the first write cycle is completed and generator 22 causes the internal empty flag signal $\overline{EF}$ to go high. In reference to FIG. 5, at a predetermined time after $\overline{EF}$ has gone high, the select signal S1 goes low. The delay caused by delay circuit 146 is typically short so that at time t11, S1 is low. Time t11 marks the beginning of the next write cycle following the first write cycle without any read operations in between. Write control circuit 114 again generates enabling signals to enable the writing of the next unit of data from input 34 into array 12. The enabling signal ICK also enables the copy register 104 to receive the updated signal from multiplexer 1. However, since the select signal S1 is low during the write cycle beginning at time t11, multiplexer 1 selects the output of register 104 through feedback path 144 instead of the input path from input 34, so that the value stored in register 104 remains unchanged. In this manner the first unit of data read into array 12 after FIFO 100 is empty during the very first write operation remains stored in register 104. Thus during the subsequent consecutive write cycles beginning at times t12, t13, the select signal S1 remains low so that multiplexer 1 continues to select the feedback path 144 and so that register 104 continues to hold the first unit of data written into array 12 during the very first cycle after empty between times t7' and t8'. The time t9' marks the beginning of the first read cycle after FIFO 100 changes from empty to non-empty after a plurality of consecutive write operations. At time t9', the empty flag signal $\overline{EF}$ is high so that gate 122 passes the read signal for generating enabling signals for the read operation. Due to the delay caused by delay circuit 124, at time t10' the clock signal $CLK_{S2}$ goes high, thereby clocking through the empty flag signal and causing the control signal S2 at terminal 128 to go high at time t10'. Therefore, in the time interval between times t9', t10', the control signal S2 remains low. Hence the control signal S2 and the enabling signals RCK, OE will cause the value of register 104 to be read and provided to output 18. As explained above, register 104 stores the first unit of data which was written into array 12 after the FIFO is empty. In this manner, the first unit of data written into array 12 may be readily read and provided to output 18 without extended delay in FIFO 10 in FIG. 1. In this manner delay 124 delays the change in value of control signal S2 until after the unit of data in register 104 has been read and provided to output 18. This prevents the garbage stored in latch 102 from being read and provided to output 18. As discussed above in reference to FIG. 6A, during the read cycle beginning at time t5 when array 12 is empty, garbage is pre-loaded into latch 102.

From the above, it is evident that irrespective of whether there is one or more than one consecutive write operations after the FIFO is empty, during the first read operation thereafter, the first unit of data written into the array is stored in register 104 and the register is always read during such read operation and provided to output 18. For simplicity, such first read operation is referred to in the claims as the first read operation after the array becomes non-empty.

During the first read operation after the array becomes non-empty, the enabling signals RE, RCK, SAE and LE enable the pre-loading of data from array 12 into latch 102 since such read operation should pre-load the second unit of data written into array 12 into latch 102, such as the unit of data written in the write cycle beginning at time t11 in FIG. 6C. The read pointer 24 selects the particular unit of data which is to pre-loaded into latch 102. Thus to be consistent, read pointer 24 is reset to "1" instead of "0" upon system reset so that, during the first read operation after the array becomes non-empty, the second unit of data to be written into array 12 will be selected for pre-loading into latch 102. Then during the next read operation, such unit of data will then be read from latch 102 and provided to output 18.

The invention has been illustrated by means of a preferred embodiment. It will be understood that various modifications may be made without departing from the scope of the invention. Thus for a pipe-lined operation, a storage means such as latch 102 is provided to store the next unit of data to be read in order to reduce access time. A reading means including read control 112, sense amplifier 14, register 116, and driver 16 then reads the pre-loaded data from the storage means to output 18 and during that same read operation, pre-loads the next unit of data to be read from array 12 into the storage means such as latch 102. Other configurations for implementing this general scheme is possible and are within the scope of the invention, which is to be limited only by the appended claims.

WHAT IS CLAIMED IS:

1. A first-in first-out memory device that has an output and that is accessed during a plurality of sequential read operations in response to read signals, each of said read signals having a rising edge which indicates activation of said read signal and a level following said rising edge which remains constant as long as said read signal is activated, said device comprising:
   a memory array;
   a first storage means for storing data;
   means responsive to said rising edges of said read signals for reading data stored in said first storage means and supplying said data read from said first storage means to the device output, and responsive to said levels following said rising edges of said read signals for reading data from the array and supplying said data read from the array to said first storage means to update the data stored in said first storage means for the next read operation, so that data can be read out of said first storage means and subsequently updated in said first storage means within a same clock cycle so as to be ready for the next read operation, so that access time of the device is reduced.

2. The device of claim 1, said device having an input and a second storage means for storing data, said device further comprising means responsive to write signals for writing units of data from the input into the array;
   wherein said device is accessed during one or more consecutive write operations occurring after the array is empty to sequentially write one or more of said units of data into the array to render it non-empty;
   wherein the second storage means stores a first of said one or more units of data written into the array after the array is empty; and
   wherein the writing means writes the first of said one or more units of data into the second storage means during a first of said one or more consecutive write operations, and does not write subsequent units of said one or more units of data into the second storage means during subsequent write operations of said one or more consecutive write operations.

3. The device of claim 2, further comprising:
   flag generation means for detecting whether the array is empty and for generating an empty flag signal to indicate whether the array is empty.

4. The device of claim 3, further comprising:
   multiplexer means interposed between the input and the second storage means; and
   feedback means for feeding back the data stored in the second storage means to the multiplexer means;
   wherein the multiplexer means selects between the data from the input and the data fed back from the second storage means in response to the empty flag signal or a signal derived therefrom, so that when the empty flag signal indicates an empty array, the multiplexer selects data from the input, and when the empty flag signal indicates a non-empty array, the multiplexer selects data from the feedback means.

5. The device of claim 4, wherein said writing means generates a select signal in response to the empty flag signal to control the multiplexer means.

6. The device of claim 2, wherein said device is accessed during one read operation after said one or more consecutive write operations, said one read operation being a first read operation to occur after the array changes from empty to non-empty during said one or more consecutive write operations and defining the first read operation after the array becomes non-empty;
   wherein, during the first read operation after the array becomes non-empty, said reading means responsive to said rising edges of said read signals, reads a first unit of data from the second storage means instead of from the first storage means and supplies such data unit to the device output.

7. The device of claim 6, wherein said reading means includes means for detecting whether any read operation is the first read operation after the array becomes non-empty and for generating a control signal to so indicate.

8. The device of claim 7, further comprising multiplexer means interposed between the first storage means and the device output, said multiplexer means being responsive to said control signal for selecting between data units from the first and the second storage means to be read and supplied to the device output, so that when the control signal indicates that the read operation is the first read operation after the array becomes non-empty, the multiplexer means selects the data unit from the second storage means to be supplied to the device output, and when the control signal indicates that the read operation is not the first read operation after the array becomes non-empty, the multiplexer means selects the data units from the first storage means to be supplied to the device output.

9. The device of claim 7, further comprising:

flag generation means for detecting whether the array is empty and for generating an empty flag signal to indicate whether the array is empty.

10. The device of claim 9, said detecting and generating means includes a delay means for generating the control signal in response to the empty flag signal wherein the control signal follows the empty flag signal be a predetermined delay so that the multiplexer means responds to the delayed empty flag signal to prevent the multiplexer means from selecting a storage means to be read until a predetermined time after the termination of the immediately preceding read operation.

11. The device of claim 10, wherein said delay means includes a flip-flop and a delay circuit that applies a delayed read signal to the clock input of the flip-flop.

12. The device of claim 1, said first storage means being a latch, wherein said reading means includes a sense amplifier, an output register, and a read control circuit for generating enabling signals for enabling the latch, the sense amplifier and the output register.

13. The device of claim 12, wherein the enabling signals enable the data in the latch to be read and supplied to the output through the output register, and enable data in the latch to be updated by reading from the array and supplying such updating data through the sense amplifier to the latch for the next read operation.

14. A method for accessing a first-in first-out memory device that has an output during a plurality of sequential read operations in response to a read signal during each operation, said read signal having a rising edge indicating activation of said read signal and a level following said rising edge wherein said level remains constant as long as said read signal is activated, said device including a memory array and a first storage means for storing data, said method comprising the steps of:

during each read operation, detecting the rising edge of said read signal and in response to the rising edge, reading data stored in the first storage means and supplying said data read from said first storage means to the device output, and detecting the level of said read signal and as long as said read signal is activated, reading data from the array and supplying said data read from the array to the first storage means to update the data stored in the first storage means for the next read operation, so that data can be read out of said first storage means and subsequently updated in said first storage means within the same clock cycle so as to be ready for the next read operation, so that access time of the device is reduced.

15. The method of claim 14, said device having an input and a second storage means, said device further comprising means responsive to write signals for writing units of data from the input into the array;

wherein said device is accessed during one or more consecutive write operations occurring after the array is empty to sequentially write one or more of said units of data into the array to render it non-empty; and wherein the second storage means stores a first of said one or more units of data written into the array after the array is empty;

said method further comprising the steps of:

writing the first of said one or more units of data into the second storage means during a first of said one or more write operations, but not writing subsequent units of said one or more units of data into the second storage means during subsequent write operations subsequent to the first of said one or more consecutive write operations.

16. The method of claim 15, wherein said device is accessed during one read operation after said one or more consecutive write operations, said one read operation being the first read operation to occur after the array changes from empty to non-empty during said one or more write operations and defining the first read operation after the array becomes non-empty;

wherein, during the first read operation after the array becomes non-empty, said reading step responsive to said rising edge of said read signal, includes reading data from the second storage means instead of from the first storage means and supplying said data read from said second storage means to the device output.

17. The method of claim 16, wherein said reading step includes detecting whether any read operation is the first read operation after the array becomes non-empty and generating a control signal to so indicate.

18. A first-in first-out memory device comprising:

a memory array for storing units of data;

means responsive to write signals, for writing said units of data to said memory array, wherein said units of data include a first unit of data which is to be written to said memory array when said memory array is empty, and after being written to said memory array, makes said memory array non-empty;

a storage means responsive to said write signals, for storing said first unit of data; and means responsive to read signals, for reading said units of data, wherein said first unit of data of said sequence of units of data is read from said storage means and subsequent units of said sequence of units of data are read from said memory array, so that access time of the first-in first-out memory device is reduced for said first unit of data.

19. The first-in first-out memory device as recited in claim 18, further comprising a latch responsive to said read signals, wherein within a same clock cycle that said reading means reads said first unit of data, said reading means preloads a next unit of data to be read in sequence from said memory array into said latch, and in a next clock cycle, said reading means reads said next unit of data from said latch instead of said memory array, so that access time of the first-in first-out memory device is reduced for said next unit of data.

* * * * *

UNITED STATES PATENT AND TRADEMARK OFFICE
CERTIFICATE OF CORRECTION

PATENT NO.   : 5,228,002
DATED        : July 13, 1993
INVENTOR(S)  : Samson X. Huang It is certified that error appears in the above-identified patent and that said Letters Patent is hereby corrected as shown below:

Column 9, line 8, in Claim 10:   replace "be" with --by--

Signed and Sealed this

Third Day of May, 1994

*Attest:*

BRUCE LEHMAN

*Attesting Officer*           Commissioner of Patents and Trademarks